UNITED STATES PATENT OFFICE.

JOHN R. OPITZ, OF ANAHEIM, CALIFORNIA.

IMPROVEMENT IN CURING TOBACCO.

Specification forming part of Letters Patent No. 175,296, dated March 28, 1876; application filed November 6, 1875.

*To all whom it may concern:*

Be it known that I, JOHN R. OPITZ, of Anaheim, Los Angeles county, State of California, have invented a Process for Curing Tobacco; and I do hereby declare the following description and accompanying drawings are sufficient to enable any person skilled in the art or science to which it most nearly appertains to make and use my said invention without further invention or experiment.

My invention relates to a novel process for curing the leaves of tobacco without removing them from the place where they are grown, and without transferring them to drying-houses.

My invention is as follows:

The operator places himself between two rows of the plants when ready for gathering, and with a hoe scrapes off about two inches of the soil between the rows for a space of two or three feet square. The leaves are then broken from the plants, beginning at the bottom of each plant, and piled upon each other in the depression which has been made until said depression is full of the piles of leaves, each pile containing about ten leaves. The bottom leaves from the plants are first laid down, and will keep the others from becoming dirty. Sheets of common brown wrapping-paper are placed over each pile of leaves, and the earth is drawn over the whole more or less thickly, according to its dryness, but about a half inch will usually suffice. As fast as one depression is filled with leaves another one is made, and the whole crop is treated in this manner and then left for two or three weeks, being turned every four or six days meantime, when the earth and paper can be removed, and the leaves bunched in the ordinary manner. In some cases it will not be necessary to make any depression at all, the quality of the soil deciding this.

Tobacco cured in this manner will be found with unbroken leaves, and as soft as silk, while it will be of a very even color.

Moisture will be found in each leaf to steam and assist in curing it, and the covering of earth, or paper and earth, will prevent the sun from burning it. The earth also has the property of extracting from the leaves a certain unpleasant and bitter flavor which is found in many kinds of tobacco, while the removing of the leaves and placing them horizontally, instead of hanging them by the stalk, prevents the loss of the juices, as happens in drying-houses.

By this method all cost of drying-houses, and much of the cost of gathering and transporting the leaves, and the consequent tearing of many of them, will be avoided. The expense will be reduced fully to one-half what it is by the ordinary process.

The paper, when used, may be saved from year to year.

This process is especially valuable in countries which have rainless seasons, and may there be employed as there is no danger of spoiling the tobacco by dampness.

Having thus described my invention, what I claim, and desire to secure by Letters Patent, is—

In a process for curing tobacco, covering it with a layer of earth in the field for from two to three weeks, the leaves being turned every four to six days, substantially as and for the purpose described.

In witness whereof I hereunto set my hand and seal.

JOHN RALF OPITZ. [L. S.]

Witnesses:
CHARLES HILLE,
J. W. CLARK.